United States Patent [19]

Kirschner

[11] 4,335,802
[45] Jun. 22, 1982

[54] SOUND ABSORBING MATERIAL

[75] Inventor: Francis Kirschner, East Hills, N.Y.

[73] Assignee: The Soundcoat Company, Inc., Brooklyn, N.Y.

[21] Appl. No.: 89,956

[22] Filed: Oct. 31, 1979

[51] Int. Cl.³ .......................... G10K 11/00; B32B 5/22
[52] U.S. Cl. .................................. 181/290; 181/294; 428/198; 428/233; 428/282
[58] Field of Search ................................ 181/290–291, 181/294, 295; 52/144–145; 428/174, 198, 233, 280, 282; 252/62

[56] References Cited

U.S. PATENT DOCUMENTS

| | | | |
|---|---|---|---|
| 3,712,846 | 1/1973 | Daniels et al. .................... 428/198 X |
| 4,010,818 | 3/1977 | Westley ............................... 181/294 |
| 4,056,161 | 11/1977 | Allen, Jr. ............................ 181/290 |
| 4,077,491 | 3/1978 | Hankel ................................ 181/290 |

OTHER PUBLICATIONS

Properties of Nomex ® Aramid Fiber, Du Pont Technical Information, Oct. 1969, pp. 1–12.

Primary Examiner—L. T. Hix
Assistant Examiner—Thomas H. Tarcza
Attorney, Agent, or Firm—Robert Scobey

[57] ABSTRACT

A multilayered sound absorbing panel formed from aramid cloth and aramid felt layers. An intervening film between the cloth and felt layers may be included, bonded to those layers in interrupted patterns so as to leave portions of the film non-bonded to the cloth and felt layers.

7 Claims, 4 Drawing Figures

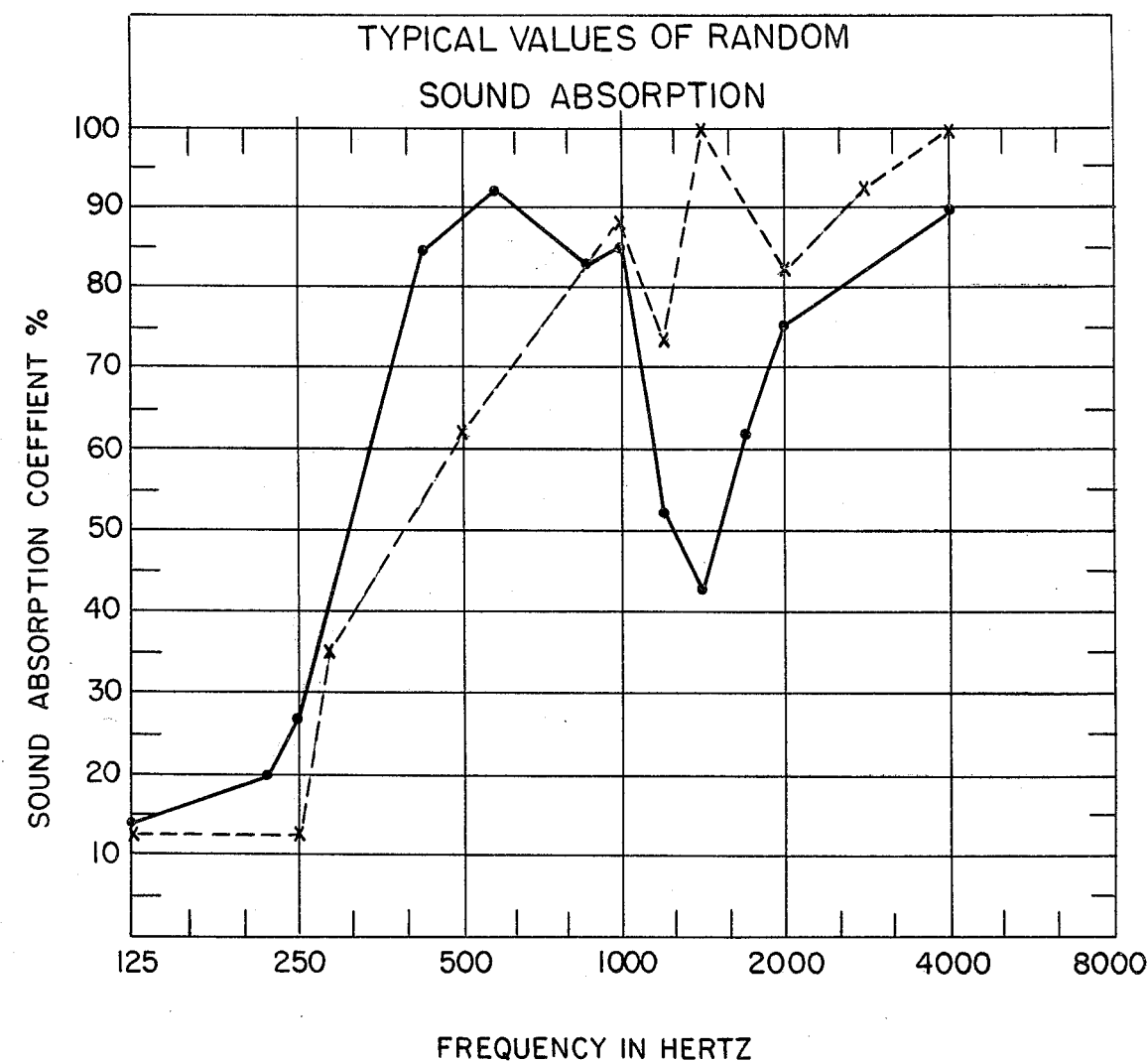

SOUND ABSORBING MATERIAL

BACKGROUND AND BRIEF DESCRIPTION OF THE INVENTION

This invention relates to sound absorbing materials. It has particular application to such materials used for aircraft interiors.

Government regulations have been under consideration to establish standards concerning smoke generation and possible limits on toxic thermal decomposition products for aircraft interiors.

Acoustical panels which are composed of, or have a core of sound absorbing material such as fiberglass, mineral wool, or polyurethane form, are well known. None of these materials are used without an exterior skin, and some of the reasons that such an exterior skin is required are:

1. Poor appearance.
2. Degradation due to vibration, heat, moisture, or liquids.
3. Lack of structural integrity.
4. Poor abrasion resistance.
5. Poor acoustical absorption when compressed.
6. Wicking of fluids into the material, constituting a possible fire hazard, or rotting of the material.
7. Deliberate mischief, including many other factors, make it necessary to have a tough abrasion resistant and visually acceptable interior to be combined with a moisture barrier and acoustical material where there are no fibers to break and dust out, causing dermatitis or respiratory problems.

An object of the present invention is to provide a new acoustical panel capable of absorbing sound and attenuating acoustical energy over a wide frequency spectrum that is more efficient in sound absorption than other panels of this general type.

It is a further object to provide a flexible panel which has good abrasion resistance, does not wick liquids, and can be easily handled.

It is also a further objective to provide an acoustical panel that has a good fire rating, does not serve as a fuel and leads to little smoke generation, in addition to having excellent acoustical and mechanical properties as described above.

A further object of the invention is to reduce the amount of toxic thermal decomposition products which may be present in previously used materials.

These objectives are achieved by utilizing a multilayered sound absorbing panel that includes an aramid cloth layer and an aramid felt layer. Such a panel is resistant to breaking of fibers, flame, high temperatures, chemical attack, abrasion, and wicking of fluids. Advantageously, an intervening film between the cloth and felt layers may be included, bonded to those layers in interrupted patterns so as to leave portions of the film non-bonded to those layers. The film may be a polyimide film. The entire panel need not be very thick, with the cloth layer about 0.002 to 0.005 inch thick, the felt layer about ⅛ to ½ inch thick, and a very thin polyimide film of about 0.0005 inch thick, to name some representative, non-limiting examples.

The invention will be more completely understood by reference to the following detailed description.

BRIEF DESCRIPTION OF THE DRAWING

FIGS. 3 and 4 are curves demonstrating sound absorption versus frequency for panels in accordance with the invention.

DETAILED DESCRIPTION

Figure 1:
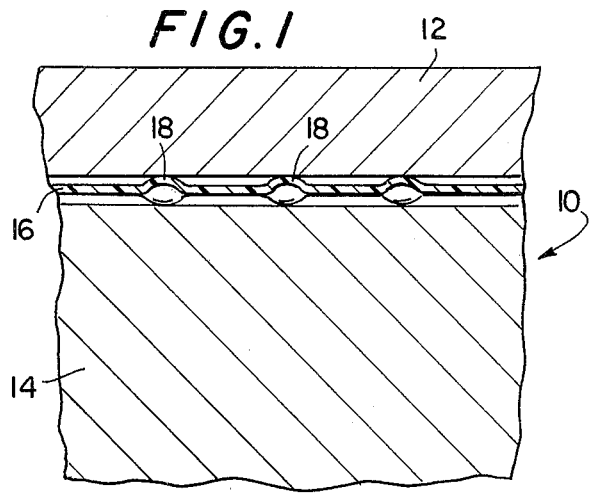
FIG. 1 is a sectional view (to an enlarged scale) of a sound absorbing panel embodying the invention.

Referring to FIG. 1, a sound absorbing panel 10 is shown. The panel includes an outer cloth layer 12 which may be of aramid material, i.e., an aromatic polyamide cloth such as "NOMEX" produced by Du Pont. See Du Pont "NOMEX" Aramid Bulletins Nos. NX-8 (March 1978), N-275 (November 1974) and N-236 (October 1969) for description of yarns and fabrics of aramid staple and tow and giving properties of aramid fibers. Aramid material is well known for its resistance to attack by flame and high temperatures, chemicals, abrasion, annd wicking of fluids. Its availability as a cloth and as a felt and the ability to weave and otherwise handle the product is well known.

The cloth layer 12 is superimposed over a felt or other layer 14 of NOMEX fibers, with an intervening polyamide film 16 which is selectively bonded in interrupted patterns, as designated at 18 (typically by embossing) so that various portions of the intervening film 16 are non-bonded to the cloth layer 12 and the fiber layer 14. Selective bonding of the film 16 may improve energy absorption through the vibration of the membrane defined by the film. While use of a membrane bonded between layers of urethane foam in an interrupted pattern, e.g., is known, use of a film 16 between aramid layers is believed to be novel. The polyamide film 16 may preferably be Du Pont's "KAPTON" polyimide film, as described in Du Pont's Bulletin H-1A.

Optimizing for maximum sound absorption is possible by appropriate variation of the following factors:

1. The thicknesses and densities of the layers 12 and 14, including that of the intervening film 16;
2. The air flow resistance of the surface materials;
3. The air flow resistance of the composite, i.e., the abrasion resistant surface exterior, the impervious intermediate membrane or intervening film 16, and the blanket interior layer 14;
4. The laminating technique, such as partial lamination;
5. Air flow resistance by embossing the surface of some of the materials.

As noted above, differing thicknesses of the layers are possible. Representative thicknesses are 0.002 to 0.005 inch for the cloth layer 12, ⅛ to ½ inch for the fiber blanket 14, and 0.0005 inch for the intervening film 16. These are representative, and should in no way be taken as limiting of the invention.

Figure 2:
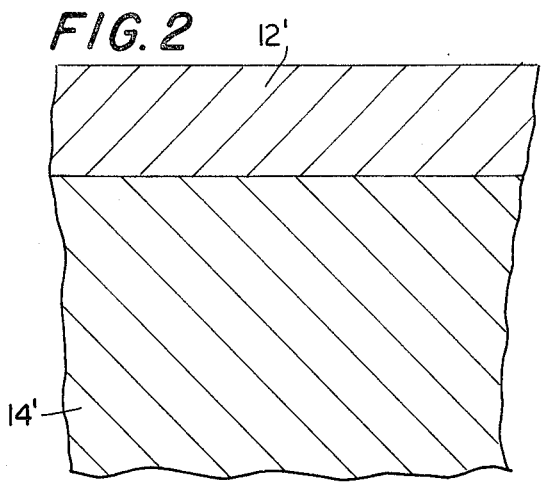
FIG. 2 is a similar sectional view of another panel, omitting the intervening film of the panel of FIG. 1.

FIG. 2 shows a construction similar to that of FIG. 1, with the intervening film 16 omitted, so that the panel comprises only a cloth outer layer 12' and an underlining fiber blanket 14'.

Figure 3:
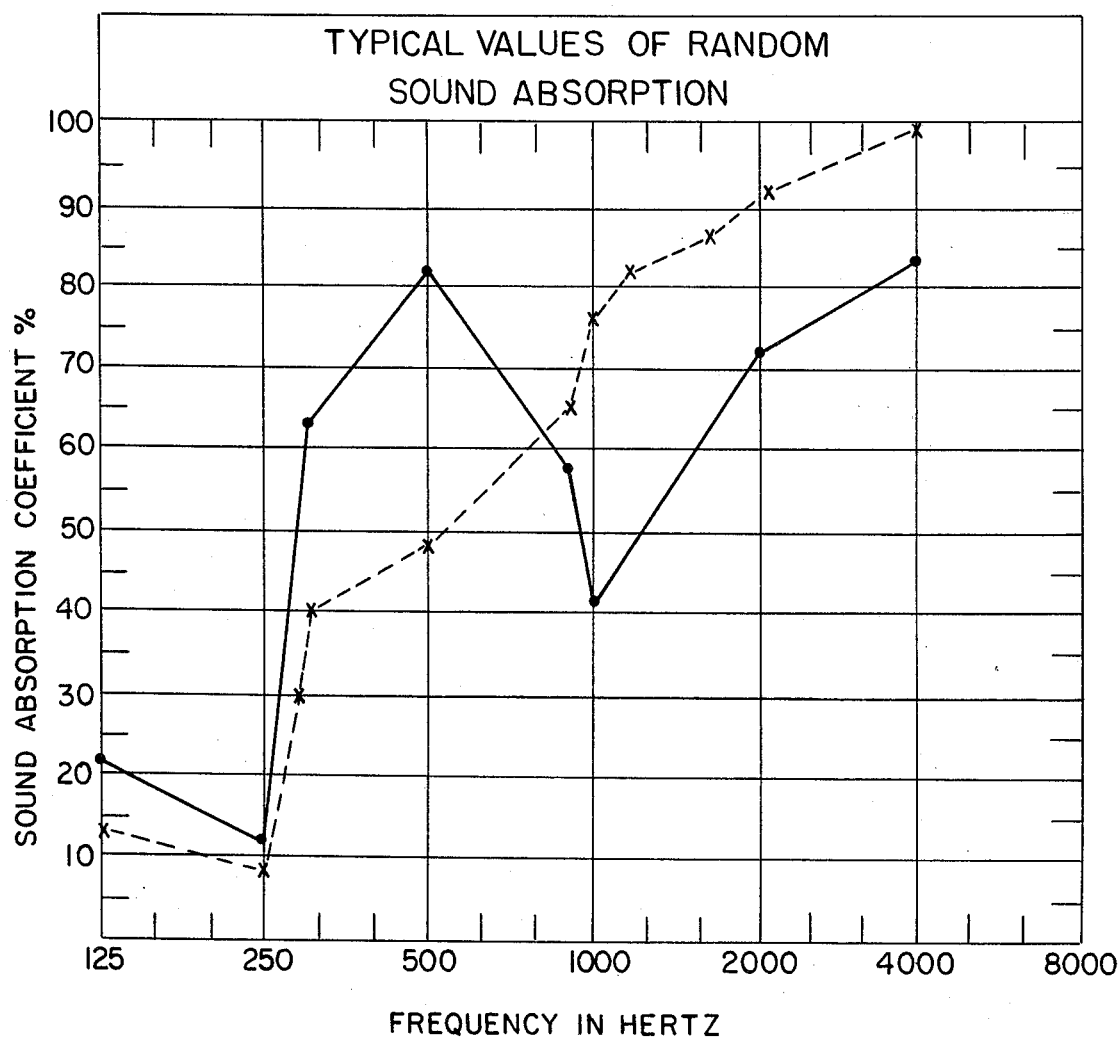

Referring to FIGS. 3 and 4, these are curves showing sound absorption coefficient (as a percent) versus frequency. In both Figs., the solid line curve is for a panel configuration as shown in FIG. 1; in both Figs. the dash line curve is for a panel configuration as shown in FIG. 2. In all the cases, the panel was roughly ½ inch in thickness. It is interesting to note that, at lower frequencies (roughly 800 Hertz or less), a panel configuration as in FIG. 1 exhibited greater sound absorption than the panel configuration of FIG. 2. Just the opposite was true at frequencies greater than about 800 Hertz. Thus the panel configuration of FIG. 1 may be preferred for lower frequencies, while that of FIG. 2 may be preferred for higher frequencies.

There have been described representative and presently preferred sound absorbing panel configurations. Modifications to the embodiments disclosed will be apparent to those skilled in the art. Accordingly, the invention should be taken to be defined by the following claims.

I claim:

1. A multilayered sound absorbing panel which comprises an aramid cloth layer and an aramid felt layer, the fibers of both layers resisting breaking, flame, high temperature, chemical attack, abrasion, and wicking of fluids.

2. A panel according to claim 1, in which an intervening film is included between said cloth and felt layers.

3. A panel according to claim 2, in which said intervening film is bonded to said cloth and felt layers in interrupted patterns so as to leave portions of said film non-bonded to said cloth and felt layers.

4. A panel according to claim 1, 2 or 3, in which said cloth layer is about 0.002 to 0.005 inch thick.

5. A panel according to claim 4, in which said felt layer is about $\frac{1}{8}$ to $\frac{1}{2}$ inch thick.

6. A panel according to claim 2 or 3, in which said film is a polyimide film.

7. A panel according to claim 6, in which said film is about 0.0005 inch thick.

* * * * *